(12) United States Patent
Kim et al.

(10) Patent No.: US 11,238,135 B2
(45) Date of Patent: Feb. 1, 2022

(54) LICENSE AUTHENTICATION METHOD IN WIRELESS ACCESS POINT, WIRELESS ACCESS POINT APPARATUS PERFORMING SAID LICENSE AUTHENTICATION, LICENSE ACTIVATION METHOD IN CLIENT APPARATUS, AND CLIENT APPARATUS INTERWORKING WITH WIRELESS ACCESS POINT

(71) Applicant: N3N CO., LTD., Seoul (KR)

(72) Inventors: Sung Yong Kim, Seoul (KR); Hye Yong Oh, Seoul (KR); Dae Hee Kim, Seoul (KR)

(73) Assignee: N3N CO., LTD., Seoul (KR)

( * ) Notice: Subject to any disclaimer, the term of this patent is extended or adjusted under 35 U.S.C. 154(b) by 475 days.

(21) Appl. No.: 16/239,538

(22) Filed: Jan. 4, 2019

(65) Prior Publication Data

US 2019/0205505 A1     Jul. 4, 2019

(30) Foreign Application Priority Data

Jan. 4, 2018   (KR) .......................... 10-2015-000115

(51) Int. Cl.
*G06F 21/10*         (2013.01)
*H04L 29/06*         (2006.01)
(Continued)

(52) U.S. Cl.
CPC .......... *G06F 21/105* (2013.01); *G06F 21/121* (2013.01); *H04L 63/0428* (2013.01);
(Continued)

(58) Field of Classification Search
CPC .... G06F 21/105; G06F 21/121; H04W 12/63; H04W 84/12; H04W 88/08; H04W 4/021;
(Continued)

(56) References Cited

U.S. PATENT DOCUMENTS

2014/0304784 A1\* 10/2014 Harrison ................. G06F 21/10
726/5
2017/0041326 A1\*  2/2017 Vedantam ............... G06F 21/10
(Continued)

FOREIGN PATENT DOCUMENTS

CN          1749914 A   \*  3/2006  ............. H04L 63/10
JP       2007214978 A       8/2007
JP       2013258670 A      12/2013

*Primary Examiner* — Zeshan Qayyum
(74) *Attorney, Agent, or Firm* — INVENSTONE Patent, LLC (57) ABSTRACT

One aspect of the present invention discloses a license authentication method in a wireless access point (AP). The method comprises receiving a license authentication request including license information from a client; calculating a distance of the client from the wireless access point in response to the received license authentication request; based on the calculated distance, determining whether the client exists within a range of allowed positions for license authentication related to license location information for allowing authentication of a license included in the license information; and determining whether to authenticate in response to the license authentication request based on the determination result.

11 Claims, 9 Drawing Sheets

(51) Int. Cl.
*G06F 21/12* (2013.01)
*H04W 12/63* (2021.01)
*H04W 84/12* (2009.01)
*H04W 88/08* (2009.01)

(52) U.S. Cl.
CPC .......... *H04L 63/107* (2013.01); *H04L 63/108* (2013.01); *H04W 12/63* (2021.01); *H04W 84/12* (2013.01); *H04W 88/08* (2013.01)

(58) Field of Classification Search
CPC .. H04W 12/06; H04L 63/107; H04L 63/0428; H04L 63/108
USPC .......................................................... 705/59
See application file for complete search history.

(56) References Cited

U.S. PATENT DOCUMENTS

| | | | |
|---|---|---|---|
| 2017/0359689 A1* | 12/2017 | Chhabra | H04W 4/80 |
| 2018/0014193 A1* | 1/2018 | Dennis | H04L 63/107 |
| 2019/0188368 A1* | 6/2019 | Hastings | H04L 63/0492 |
| 2020/0196150 A1* | 6/2020 | Chen | H04L 63/0876 |

\* cited by examiner

LICENSE AUTHENTICATION METHOD IN WIRELESS ACCESS POINT, WIRELESS ACCESS POINT APPARATUS PERFORMING SAID LICENSE AUTHENTICATION, LICENSE ACTIVATION METHOD IN CLIENT APPARATUS, AND CLIENT APPARATUS INTERWORKING WITH WIRELESS ACCESS POINT

CROSS-REFERENCE TO RELATED APPLICATIONS

This application claims the benefit of priority of Korean Patent Application No. 10-2018-0001155 filed on Jan. 4, 2018, all of which are incorporated by reference in their entirety herein.

BACKGROUND OF THE INVENTION

Field of the Invention

The present invention relates to a license authentication method and, more particularly, to a method for activating a license efficiently.

Related Art

Recently, as smartphones began to spread exponentially, digital applications and/or digital contents are commonly executed in the smartphone. Accordingly, researches are being conducted into a safe method for issuing and activating a license, which allows only the person authorized to actually execute applications and/or digital contents to execute the corresponding application and/or contents.

Conventional methods for issuing and activating a license mostly rely on user information after an application and/or contents are purchased.

In other cases, location-based methods are used for activating a license; however, location-based methods require accurate positioning of a target apparatus with respect to a global coordinate system based on the Global Positioning System (GPS) or Global Navigation Satellite System (GNSS) and thus are not appropriate in terms of security of a user's personal information and due to their high complexity.

SUMMARY OF THE INVENTION

To solve the problem above, an object according to one aspect of the present invention is to provide a method for authenticating and activating a license based on location authentication using only a distance relationship without involving positioning as in the conventional methods operating based on an accurate location of a client.

To achieve the object, a license authentication method in a wireless access point (AP) according to one aspect of the present invention comprises receiving a license authentication request including license information from a client; calculating a distance of the client from the wireless access point in response to the received license authentication request; based on the calculated distance, determining whether the client exists within a range of allowed positions for license authentication related to license location information for allowing authentication of a license included in the license information; and determining whether to authenticate in response to the license authentication request based on the determination result.

Whether the client exists within the range of allowed positions for license authentication may be determined by comparing a first distance value which is a distance from the wireless access point to a position corresponding to the license location information and a second distance value which is a distance from the wireless access point to the client.

Based on the calculated distance, the determining whether the client exists within a range of allowed positions for license authentication related to license location information included in the license information may comprise comparing the first distance value with the second distance value; comparing a distance difference between the first distance value and the second distance value with a threshold value; and if the distance difference is smaller than the threshold value, determining that the client exists within the range of allowed positions for license authentication.

The second distance value may be calculated based on a radio signal transmitted and received between the wireless access point and the client.

Based on the determination result, the determining whether to authenticate in response to the license authentication request may comprise determining whether to authenticate in response to the license authentication request based on allowed time information included in the license information.

The determining whether to authenticate in response to the license authentication request based on the determination result may comprise determining whether to authenticate in response to the license authentication request based on at least one of allowed product identification information and user identification information included in the license information.

Whether to authenticate may be determined by comparing at least one of allowed product identification information and user identification information included in the license information with pre-stored allowed product identification information and pre-stored user identification information.

The pre-stored allowed product identification information and the pre-stored user identification information may be obtained from at least one of an internal local storage and an external database.

The license information may include the license location information, allowed time information and allowed code information related to allowing authentication of a license, where the allowed code information may include at least one of allowed product identification information and user identification information.

The license information is encrypted, and decrypting the license information may be further included.

The license information is public-key encrypted, and the license information may be decrypted by a public-key scheme.

The license authentication method may further comprise providing license authentication information to the client according to determination with respect to whether to authenticate in response to the license authentication request.

To achieve the object, a wireless access point apparatus performing license authentication according to another aspect of the present invention comprises a request receiving unit receiving a license authentication request including license information from a client; a distance calculating unit calculating distance from the wireless access point to the client in response to the received license authentication request; a determining unit determining, based on the calculated distance, whether the client exists within a range of allowed positions for license authentication related to license location information for allowing authentication of a license included in the license information; and an authentication determining unit determining whether to authenticate in response to the license authentication request based on the determination result.

To achieve the object, a license activation method of a client apparatus interworking with a wireless access point according to yet another aspect of the present invention comprises transmitting a license authentication request including license information to at least one wireless access point (where the license information includes license location information for allowing authentication of a license); obtaining license authentication information allowing authentication of a license in response to the license authentication request; and activating a license by using the obtained license authentication information.

The license authentication information may be obtained according to whether the client apparatus exists within a range of allowed positions for license authentication related to license location information based on a distance between the at least one wireless access point and the client.

The license authentication request may be transmitted automatically depending on whether at least one predetermined condition for activating a license authentication request is satisfied.

The at least one predetermined condition may include at least one of a condition for a location of the client terminal and a condition for a network to which the client terminal is connected.

Activation of the license may be accomplished based on a predetermined policy for activating a license.

The predetermined policy may include a policy related to a condition for a wireless access point the license authentication information of which has to be obtained among the entire wireless access points existing within a predetermined range from the license location information.

To achieve the object, a client apparatus interworking with a wireless access point for activating a license according to still another aspect of the present invention comprises a transmitting unit transmitting a license authentication request including license information to at least one wireless access point (where the license information includes license location information for allowing authentication of a license); a receiving unit receiving license authentication information allowing authentication of a license in response to the license authentication request; and a license activating unit activating a license by using the obtained license authentication information.

DESCRIPTION OF EXEMPLARY EMBODIMENTS

Since the present invention may be modified in various ways and may provide various embodiments, specific embodiments will be depicted in the appended drawings and described in detail with reference to the drawings.

However, it should be understood that the specific embodiments are not intended to restrict the gist of the present invention to the specific embodiments; rather, it should be understood that the specific embodiments include all of the modifications, equivalents or substitutes described by the technical principles and belonging to the technical scope of the present invention.

The terms such as first and second are introduced to describe various elements, but the elements should not be limited by the terms. The terms are used only for the purpose of distinguishing one from the other elements. For example, a first element may be called a second element without leaving the technical scope of the present invention, and similarly, the second element may be called the first element. The term and/or includes any one of a combination of a plurality of related disclosed elements or a plurality of related disclosed elements.

If an element is said to be connected or attached to other element, the former may be connected or attached directly to the other element, but there may be a case in which another element is present between the two elements. On the other hand, if an element is said to be directly connected or attached to other element, it should be understood that there is no other element between the two elements.

Terms used in this document are intended only for describing a specific embodiment and are not intended to limit the technical scope of the present invention. A singular expression should be understood to indicate a plural expression unless otherwise explicitly stated. The term of "include" or "have" is used to indicate existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all of the terms used in this document, including technical or scientific terms, provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

In what follows, with reference to appended drawings, preferred embodiments of the present invention will be described in more detail. In describing the present invention, to help overall understanding, the same reference symbols are used for the same elements in the drawings, and repeated descriptions of the same elements will be omitted.

Figure 1:
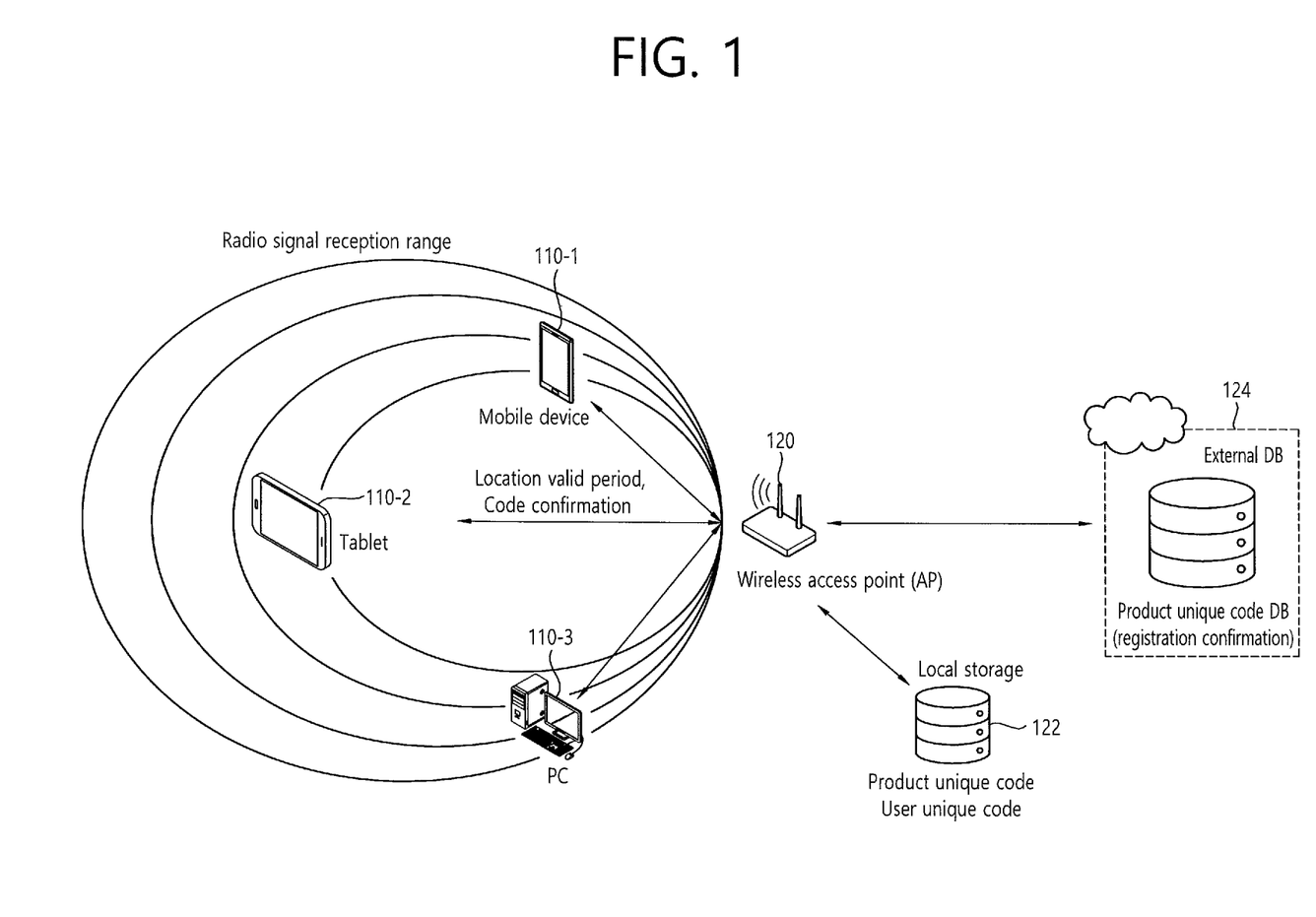
FIG. 1 illustrates a system in which a license authentication method according to one embodiment of the present invention is used.

FIG. 1 illustrates a system in which a license authentication method according to one embodiment of the present invention is used. As shown in FIG. 1, a system related to license authentication according to one embodiment of the present invention may comprise a client terminal 110-1~110-3 and a wireless access point (AP) 120.

Referring to FIG. 1, the client terminal 110-1~110-3 receives authentication information from a wireless access point 120 by using its license information and secures validity, namely use rights. The client terminal 110-1~110-3 has license information and is capable of executing an application or software which activates a license depending on an authentication decision from the wireless access point 120, which may include various types of devices capable of wireless communication and data processing such as a mobile terminal 110-1, for example, a smartphone; tablet 110-2; and PC 110-3.

The client terminal 110-2~110-3 may also be referred to as a mobile station (MS), user equipment (UE), user terminal (UT), wireless terminal, access terminal, terminal, fixed or mobile subscriber unit, subscriber station, cellular phone, wireless device, wireless communication device, wireless transmit/receive unit, mobile node, mobile, mobile station, personal digital assistant (PDA), smartphone, laptop, netbook, personal computer, wireless sensor, consumer equipment (CE), or other term. Various embodiments of the client terminal 110-2~110-3 may include not only a cellular phone, smartphone having a wireless communication function, a personal digital assistant (PDA) having a wireless communication function, wireless modem, personal computer having a wireless communication function, photographing device such as a digital camera having a wireless communication function, gaming device having a wireless communication device, music recording and playing appliance product having a wireless communication function, Internet home appliance capable of wireless Internet access and browsing but also a portable unit or a terminal integrating a combination of the aforementioned functions; however, the present invention is not limited to the specific embodiments described above.

The client terminal 110-1~110-3 may receive license information through an external network and keep the received license. The license information may be received and stored in the form of a file and may include information about a valid location, valid period, and valid code related to license authentication and activation. At this time, the valid location may be utilized as a primary factor, and the valid period and valid code may be utilized optionally. Here, the use of the term valid implies that a license is granted to be effective, and therefore, valid location, valid period, and valid code information may be expressed alternatively as allowed location (or license location information), allowed period and/or allowed time, and allowed code information. The aforementioned valid location, valid period, and valid code information may be the information determined in association with downloads of applications, documents, and/or contents to be activated. For example, when the client terminal 110-1~110-3 downloads particular contents from a contents server, a license file associated with the downloaded contents is also downloaded, and authentication of a downloaded license file may be performed in conjunction with the wireless access point 120, in particular, by a position estimation process according to distance calculation from the wireless access point 120. After authentication is completed, the client terminal 110-1~110-3 may parse the authentication information and execute the corresponding contents.

The client terminal 110-1~110-3 transmits a license authentication request including license information to at least one wireless access point 120 in the surroundings thereof and waits for a result of the request. At this time, basically it may be preferable to transmit the license authentication request to all of the access points 120 within a particular distance (for example, a distance that may be reached by a wireless communication signal).

The wireless access point 120 is a device which receives a license authentication request from the client terminal 110-1~110-3 and performs license authentication in response to the received request. This device may be called an authentication AP. The wireless access point 120 is an access point apparatus which performs wireless communication and may include equipment which performs wireless communication via short range wireless communication protocols such as Bluetooth, Zigbee, Wi-Fi, and Lora and/or wide area wireless communication protocol; however, the wireless access point is not limited to the equipment listed above.

If receiving a license authentication request, the wireless access point 120 calculates a distance to the client in response to the request. The distance may be calculated based on the strength of a received radio signal. Or the distance may also be calculated based on the time elapsed from transmission of a radio signal until the radio signal is returned. And by calculating the distance of a valid location included in the license information from the wireless access point 120, the wireless access point 120 compares the two distance values (the distance between the valid location and the wireless access point 120 and the distance between the client terminal 110 and the wireless access point 120). At this time, if a difference between the two distances falls within a tolerance range of the distance considered, the wireless access point 120 may determine that the client terminal exists at the corresponding location and perform validity authentication.

And the wireless access point 120 may perform time-based authentication by comparing valid time information with the current time and perform authentication on the basis of a unique code using valid code information by comparing information related to the terminal or software/contents executed in the terminal and/or user identification information with information related to pro-stored software/contents and/or pre-stored user identification information. The pre-stored software/contents-related information and/or user identification information for authentication based on a unique code may be stored in a local storage 122 inside the wireless access point 120 and/or an external database 124.

Figure 2:
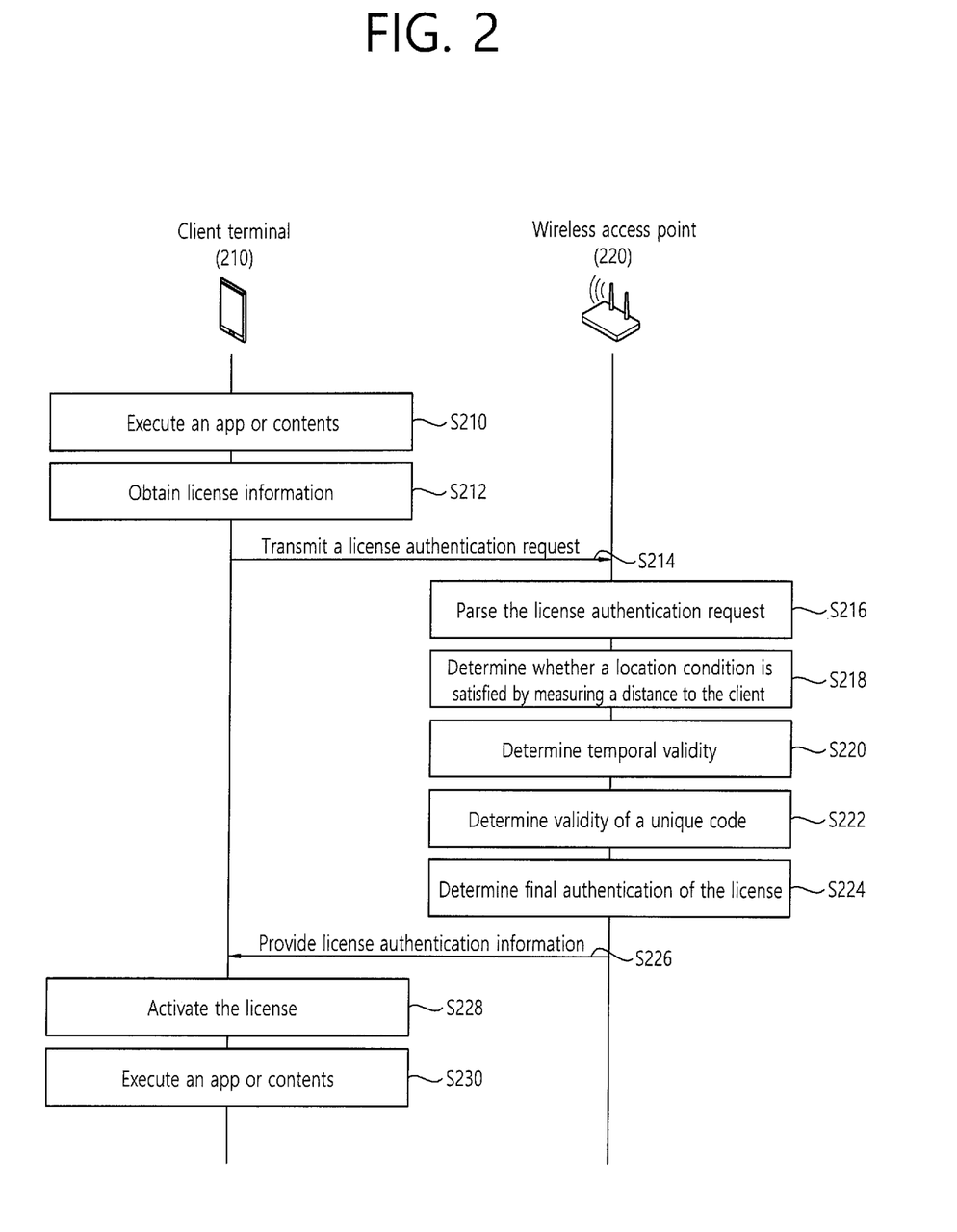
FIG. 2 is a flow diagram illustrating a license authentication method according to one embodiment of the present invention.

FIG. 2 is a flow diagram illustrating a license authentication method according to one embodiment of the present invention.

A client terminal 210 may have contents and/or applications. The contents are digital contents and may include multimedia contents such as movie or music contents. Also, the application may represent a software program which executes a specific function. The contents and applications may be associated with license information for executing them. The license information may be downloaded with the contents and applications.

Referring to FIG. 2, if the client terminal 210 executes a document, contents, or application S210, an operation for authenticating associated license information is performed. This operation may be performed through a pop-up message saying "Please perform license authentication". Or the operation may be performed automatically according to a predetermined specific condition. For example, if the specific condition is related to a location, a process for license authentication may be initiated when location detecting module 210 of the client terminal detects that the client module is located in a specific area. Similarly, the client terminal 210 may start the process for license authentication when the client terminal accesses a specific network. A condition for triggering the license authentication may be predetermined by a manufacturer of the contents and/or applications. For example, a sponsor who hosts a meeting may designate an area related to a meeting place in advance and configure a condition so that a terminal of a user who arrives at the corresponding area may start license authentication. The triggering condition may be configured in various ways such as location-based, time-based, user-based, or network-based.

If the client terminal 210 executes the app or contents, namely license authentication is triggered, the client terminal 210 obtains license information associated with the app or contents S212. However, the license information is not always obtained after the app or contents are executed. The license information may be obtained before the app or contents are executed. In other words, through a separate process, the license information may be obtained independently of the app or contents.

The client terminal 210 then generates a license authentication request based on the obtained license information and transmits the generated request to the wireless access point 220, S214. At this time, the license information may be encrypted for the purpose of security and provided to the wireless access point 220 by being included in the license authentication request.

After receiving the license authentication request, the wireless access point 220 parses the license authentication request S216. At this time, in the case of an encrypted file, decryption may be required. The wireless access point 220 parses the license authentication request and obtains license location information, license time information and/or license code information.

Then spatial validity is determined based on the obtained license location information S218. More specifically, a distance to the client terminal 210 is measured, and it is checked whether the distance satisfies a location condition. However, this checking is not based on a location specified by accurate coordinates. This is so because accurate location information is closely related to a security problem for each person. The wireless access point 220 according to one embodiment of the present invention does not figure out coordinate-based accurate location of the client terminal 210 but instead determines spatial validity based on a relative distance with respect to the wireless access point 220.

And if license time information is optionally included in the license information, the wireless access point 220 determines temporal validity by comparing the license time information with the current time and/or by referring to license valid time S220.

Also, if the license information optionally includes license code information, the wireless access point 220 determines validity of a unique code of the license code information by comparing the unique code with pre-stored allowed code information S222.

And if all of the information included in the license information is determined as valid, authentication for the license may be determined finally as valid S224. If any information is turned out to be non-valid, however, the license is not authenticated. When authentication is valid, license authentication information which indicates valid authentication is generated and provided to the client terminal 210, S226. At this time, the authentication information may include information by which the license may be activated. The information may include license key information.

The client terminal 210 receives license authentication information and activates the license S228. By doing so, the client terminal 210 may obtain a contents and/or application decryption key included in the license.

And the client terminal 210 executes an app or contents based on the decryption key S230.

Figure 3:
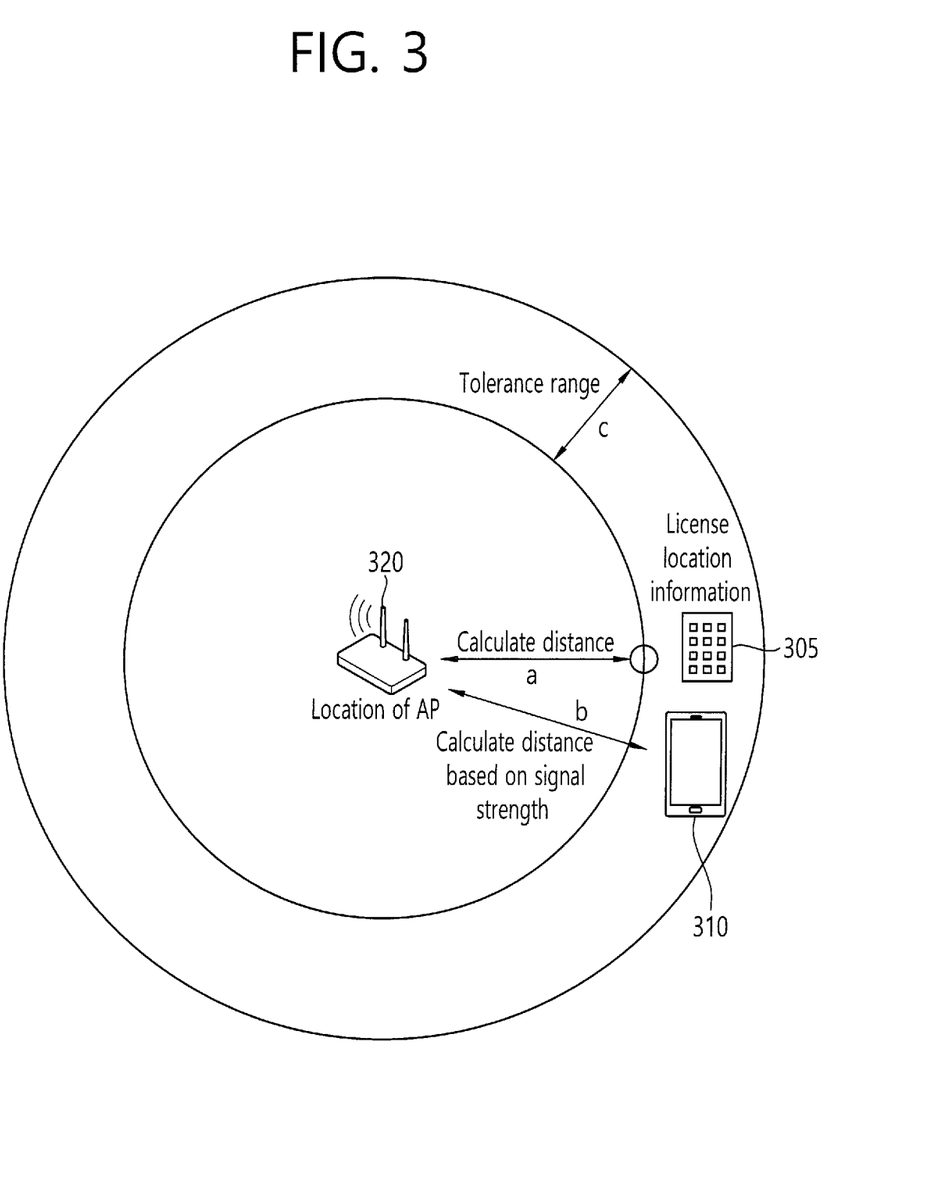
FIG. 3 illustrates a process for determining spatial validity through a distance relationship.

FIG. 3 illustrates a process for determining spatial validity through a distance relationship.

Referring to FIG. 3, when manipulating a particular application, document and/or contents, the client terminal 310 transmits a license file 305 to a wireless access point 320 to check authentication. The wireless access point 320 checks validity of the license file 305, which may be performed based on location, time and/or available product code information. In particular, in making location-based determination, the wireless access point 320 determines whether the client terminal 310 in a valid location by comparing a distance (a) calculated based on its location and a valid location included in the license information 305 with a distance (b) calculated based on a radio signal between the wireless access point 320 and the device. In other words, the wireless access point 320 determines that the device is at a nearby location if a difference (| a−b |) between the two calculated distances falls within a predetermined tolerance (c).

Figure 4:
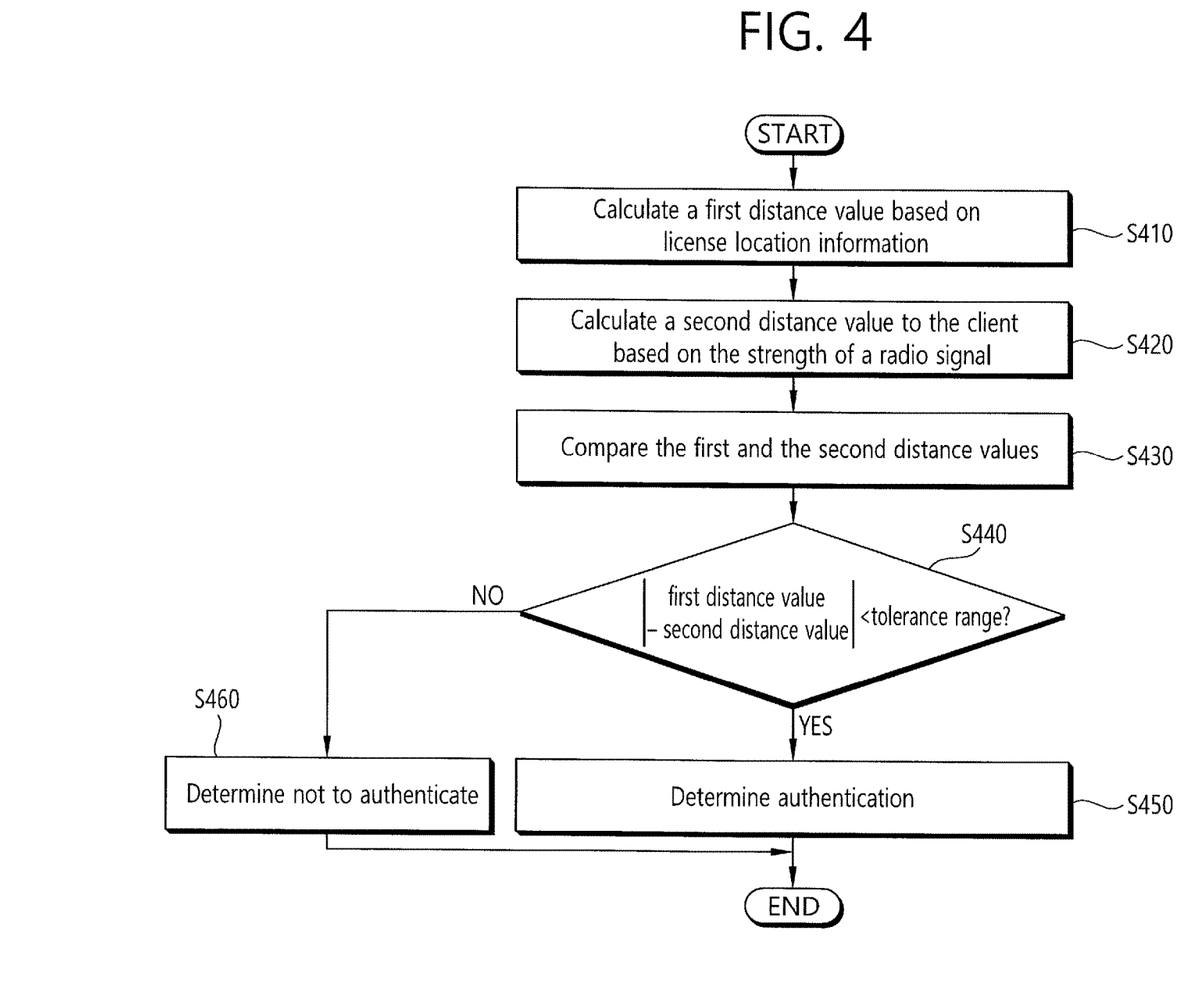
FIG. 4 is a flow diagram illustrating a process for determining spatial validity at a wireless access point.

FIG. 4 is a flow diagram illustrating a process for determining spatial validity at a wireless access point.

Referring to FIG. 4, a wireless access point may have its own location information. While having its own coordinate information, if valid location information (license location information) included in the license information is received, the wireless access point may calculate a relative distance between its coordinate information and valid location information, a first distance value S410. The calculation may be performed based on a two-dimensional vector calculation.

And the wireless access point may calculate a second distance value, a distance from the wireless access point to the client terminal based on a radio signal received from the client terminal which has transmitted a license authentication request to the wireless access point S420. The radio signal used for this calculation includes at least one of all of the radio signals between the wireless access point and the client terminal. Among them, the license authentication request may also be included. In other words, without transmitting a separate radio signal, the license authentication request may be analyzed, and a distance to the client terminal may be calculated. At this time, the wireless access point may calculate the distance based on strength of a radio signal. Or the distance to the terminal may be calculated based on the time elapsed from the moment at which the wireless access point transmits a pilot signal until a signal returned as feedback of the transmitted pilot signal is received. The distance may be calculated by taking into account the information about spatial features and structure in the surroundings of the wireless access point. For example, when the wireless access point exists within a building, the distance to the client terminal may be calculated by considering the information about indoor obstacles or floor information. Since there may also be various types of obstacles outdoors, a distance calculation algorithm which takes into account interference due to obstacles may be executed.

When the first distance value based on license location information and the second distance value based on a radio signal are acquired, the wireless access point compares the two distance values S430. Then the wireless access point determines whether an absolute value (| a−b|) of a difference between the two distance values falls within a predetermined tolerance (C) S440 (refer to FIG. 3 for a, b, and c).

Then, if the absolute value lies within the tolerance range (c), authentication is determined S450, and if not, the request is not authenticated S460. At this time, the tolerance range (C) is used to compensates for the error, which may be modified by a user's setting.

Figure 5:
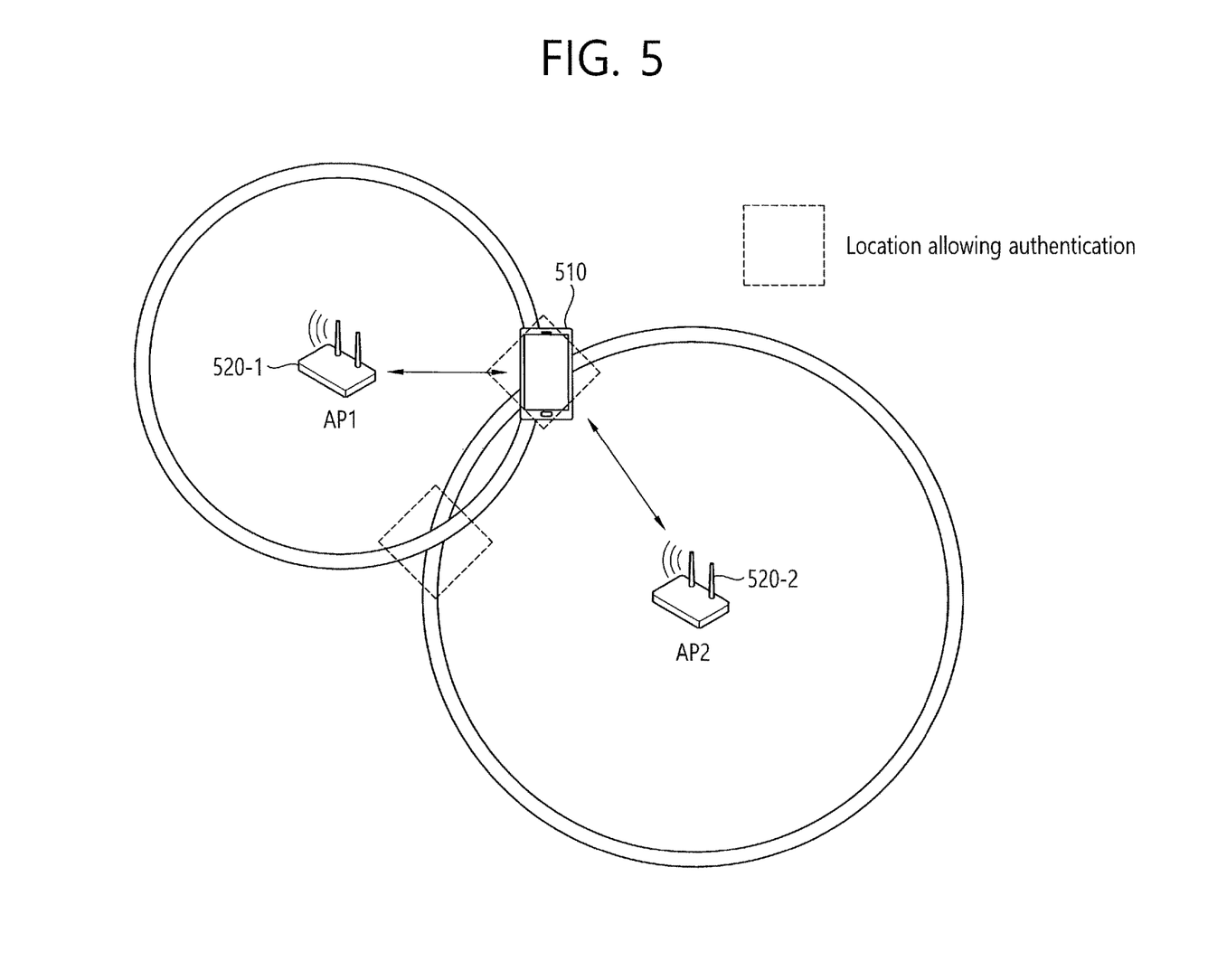
FIG. 5 illustrates a concept for allowing authentication by being authenticated by a plurality of wireless access points.

FIG. 5 illustrates a concept for allowing authentication by being authenticated by a plurality of wireless access points.

Referring to FIG. 5, the client terminal 510 may have a predetermined policy to activate a license. The policy may include conditions set by the license provider. In other words, if authentication is received from only one wireless access point, as in the embodiment of FIG. 3, the authentication may be received in a circular area around the wireless access point, which may be regarded as too large. In other words, since authentication is allowed only through a relative distance while a desired license activation area corresponds to part of the circular area, it may be difficult to specify the part of the area.

Therefore, according to an embodiment of the present invention, through a policy mandating authentication from a plurality of wireless access points (520-1, 520-2), the license provider may guide the license to be activated only in a desired, specific area. In other words, license authentication may be made valid at an accurate location through a topological relationship formed among distributed wireless access points (520-1, 520-2).

For example, when authentication from two wireless access points 520-1, 520-2 is required, the license is all authenticated only in the two areas (those areas indicated by dotted lines) formed by intersection of circular tolerance ranges generated by the two wireless access points 520-1, 520-2, and therefore, authentication into a particular area may be specified. This kind of policy related to license activation may be stored in a local storage of the terminal. This policy is generated in accordance with an application, document and/or contents associated with the corresponding license, which may be carried out in conjunction with execution of the app/contents.

In this context, when three wireless access points are utilized, one specific area may be uniquely identified as a license activation area, and when the client terminal 510 is located within one license activation area, namely when the client terminal 510 acquires authentication information from all of the three adjacent wireless access points, the client terminal 510 may have a policy by which the license is activated.

The policy for license activation may be defined in various forms. The client terminal 510 may have information about adjacent access points related to license activation and utilize a policy associated with the adjacent access points in various ways. For example, the license may be activated when authentication information is received from specific access points B, C among the adjacent access points A, B, C. Or the ratio of license activation may be configured. For example, if the license activation ratio is 70%, the license is activated only when license authentication is received from more than 7 out of 10 adjacent access points. In particular, for a plurality of access points which exist within a multi-floored building, a policy may be generated by taking into account the floors. In other words, a policy may be designed so that a license is rather deactivated if authentication information is received from an access point of a specific floor. If authentication information is received from an access point of the fourth floor while license activation is aimed for the third floor, it may be more relevant not to activate the license by determining that the client terminal is currently at an inappropriate location.

According to another embodiment of the present invention, whether to authenticate a license may be determined by exchanging information related to authentication of a client terminal among wireless access points. For example, a first wireless access point may request information about an authentication process for a specific client terminal from a second wireless access point, receive information about authentication-related determination from the second wireless access point in response to the request, and utilize the received information for determining authentication of the first wireless access point itself.

Figure 6:
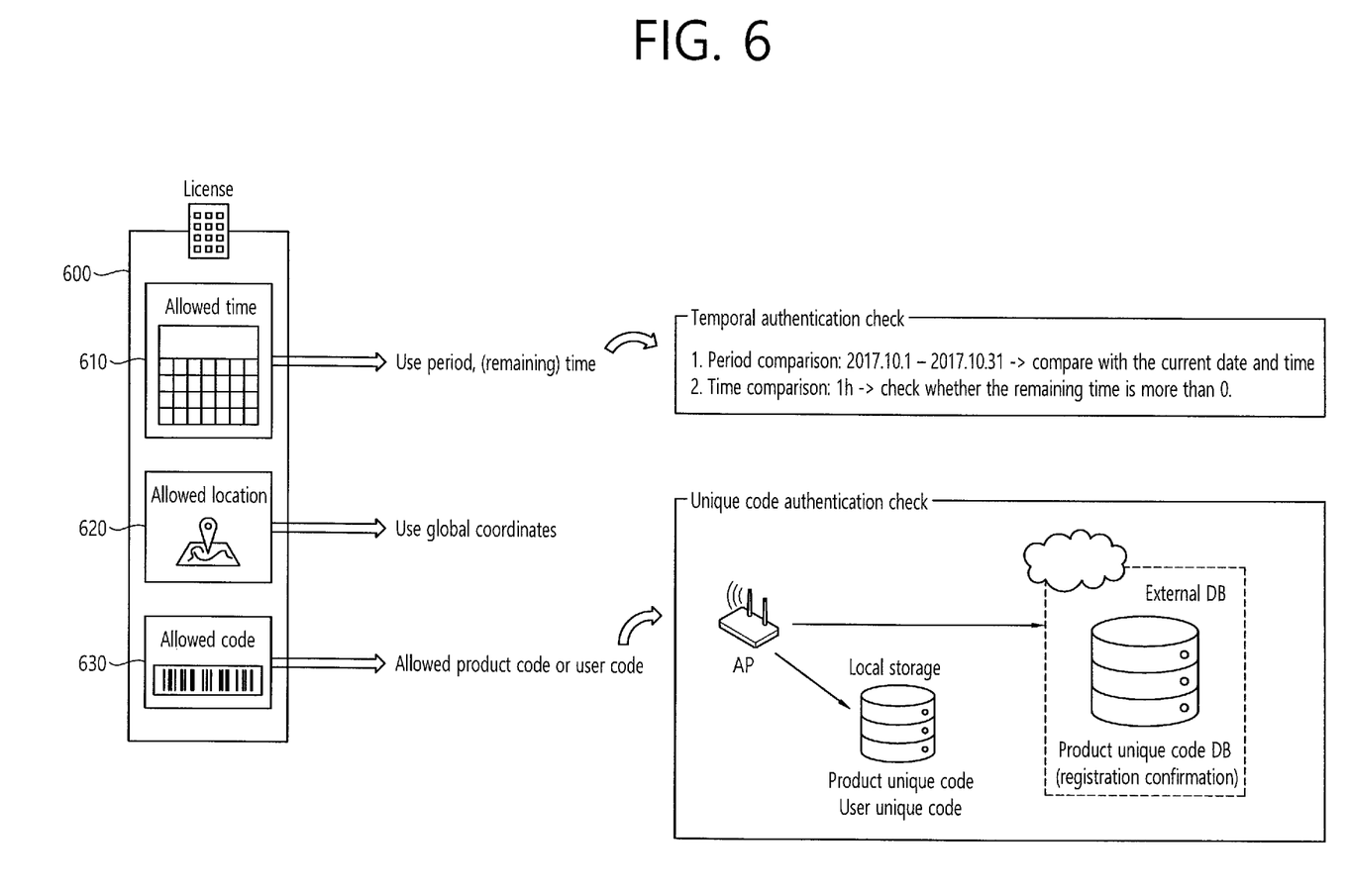
FIG. 6 illustrates a concept for determining use rights through temporal validity and code confirmation.

FIG. 6 illustrates a concept for determining use rights through temporal validity and code confirmation.

Referring to FIG. 6, a license 600 may include allowed time information 610, allowed location information 620, and allowed code information 630. Here, the allowed time information 610 may be provided as a time period during which the license is validly utilized or remaining valid time. The allowed location information 620 may be provided in the form of global coordinates. Also, the allowed code information 630 may be provided in the form of an allowed product code and/or user code. At this time, the allowed product code represents unique information of a terminal or unique code information of software or contents used in the terminal. The user code may include account information which may represent login-related information.

Since determination of spatial validity based on the allowed location information 620 has been described in detail with reference to FIGS. 3 to 5, a process for determining temporal validity based on the allowed time information 610 is now described in more detail. In this case, a wireless access point may determine validity through comparison of periods and comparison of time. For example, if an allowed period is configured as 2017.10.1-2017.10.31, the wireless access point may check the current date and time to determine whether the current date and time is included in the allowed period. A license may be determined as valid only when the current date and time are included in the allowed period. In the case of the allowed time, remaining time information may be provided, which is covered by the license in units of month, days, and hours. At this time, it is checked whether the remaining time is more than 0, and if so, the license is determined as valid. For the case of the allowed time, it may be preferable that the client terminal subtracts execution time of a related app and/or contents from the remaining time to update the allowed time information in real-time.

In addition to the above, determination of use validity based on the allowed code information 630 is performed through comparison of the allowed code information with the information stored in a local storage and/or an external database. In other words, if the allowed product code or user code is compared with allowed product codes or user codes pre-stored in the local storage and/or external database, and the allowed product code or user code matches one in the local storage or external database, the license is determined as valid but invalid, otherwise.

In addition to the information above, the license 600 may further include information about the number of allowances and/or allowed IP information, and the wireless access point may perform additional determination of validity by checking the information about the number of allowances and/or the allowed IP information.

Figure 7:
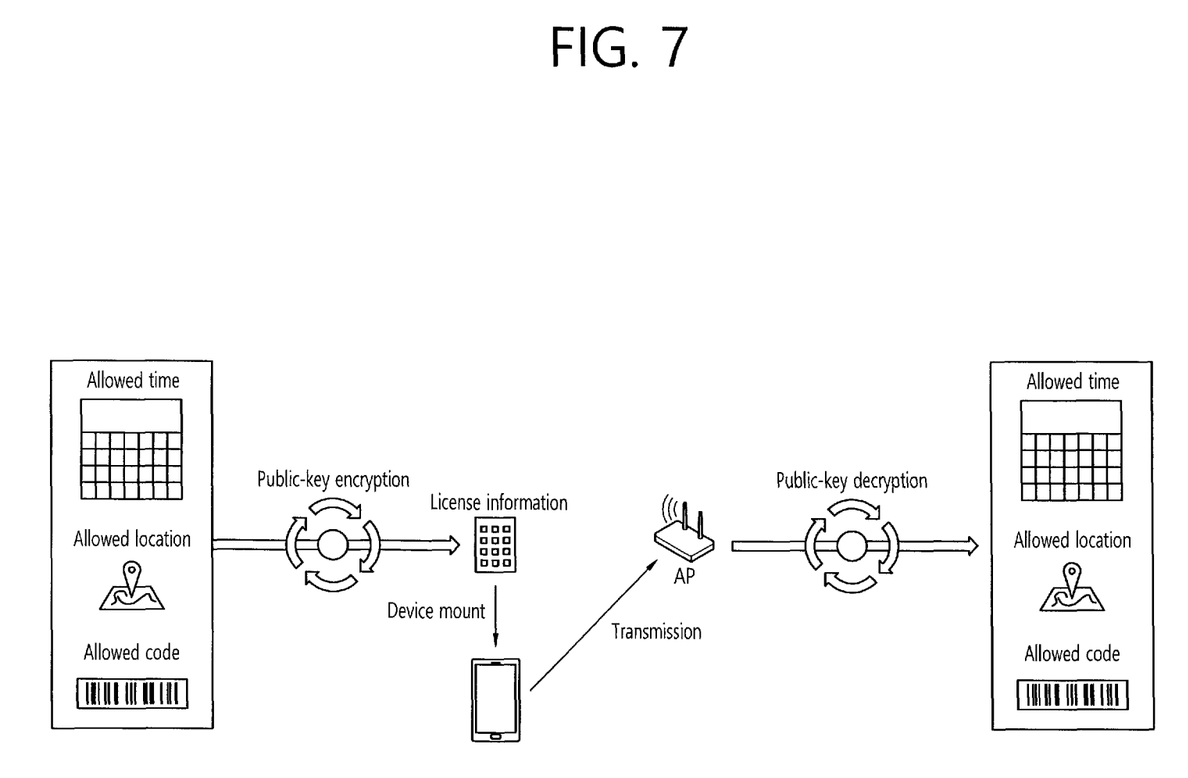
FIG. 7 illustrates a process for encrypting a license.

FIG. 7 illustrates a process for encrypting a license.

Referring to FIG. 7, license information may be encrypted. In other words, a contents provider or an application provider may directly encrypt license information. At this time, encryption may be performed based on a public-key encryption scheme. Or depending on the situation, a client terminal may directly perform encryption.

The encrypted license information is provided to a wireless access point by being included in a license authentication request. The wireless access point decrypts the license information encrypted based on a public-key encryption scheme and acquires allowed time information, allowed location information, and allowed code information. And then the wireless access point determines temporal validity, spatial validity and/or code-based validity.

According to an embodiment of the present invention, the license authentication method may be utilized for ticketing. In other words, a related application may be executed to activate a ticket in a specific area, and activation of tickets managed by the application may be controlled through the license authentication method. Similarly, the license authentication method may be utilized for such a case where data are shared in a special meeting. For example, a sponsor hosting a meeting in a specific area may generate meeting-related data and construct a policy and system which authenticates and activates the data by using the license authentication method according to one embodiment of the present invention. At this time, attendees may download meeting-related data and/or activate pre-downloaded meeting data only if they enter a meeting-related area while carrying their own terminal.

Figure 8:
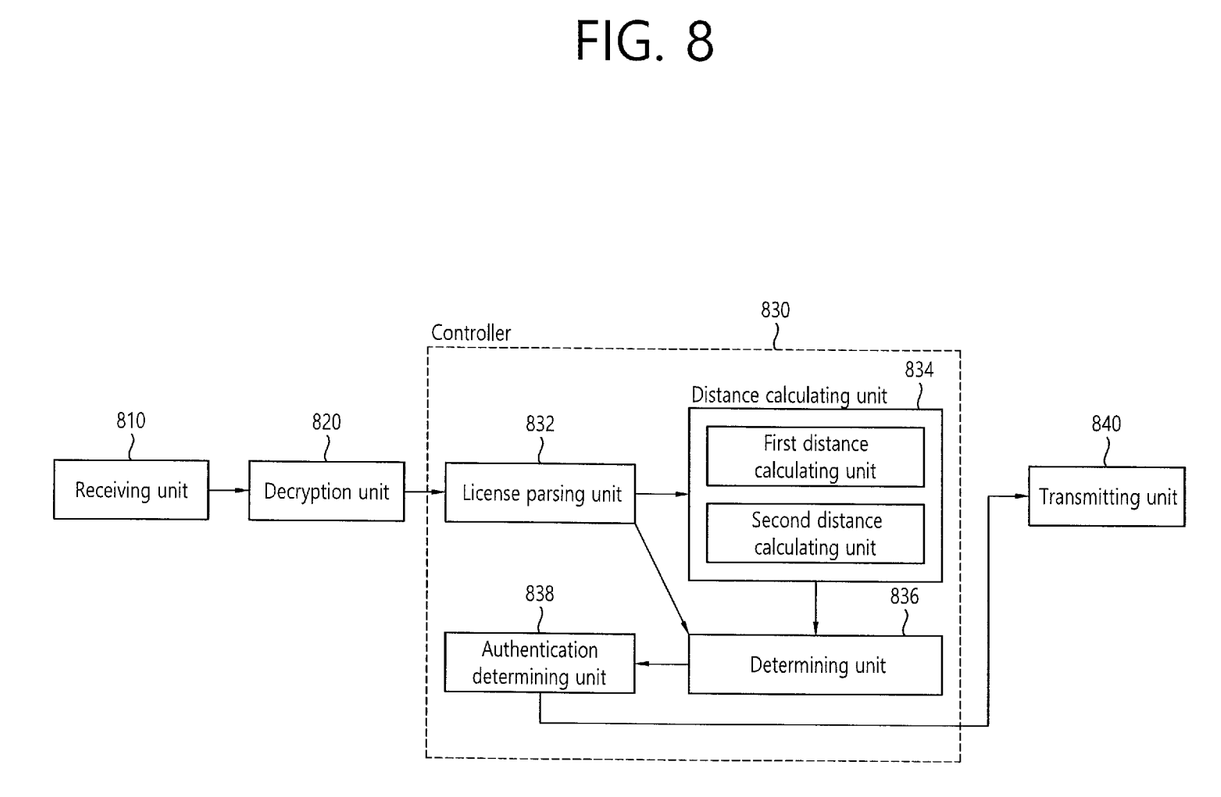
FIG. 8 is a block diagram illustrating a structure of a wireless access point apparatus which performs license authentication according to one embodiment of the present invention.

FIG. 8 is a block diagram illustrating a structure of a wireless access point apparatus which performs license authentication according to one embodiment of the present invention. As shown in FIG. 8, a wireless access point apparatus according to one embodiment of the present invention may comprise a receiving unit 810, decryption unit 820, controller 830, and transmitting unit 840. Each element has been distinguished by its function and may be implemented by a hardware processor and/or communication equipment such as an antenna, which may be implemented together with a storage storing commands to perform the corresponding function.

Referring to FIG. 8, the receiving unit 810 receives a license authentication request from the client terminal. The receiving unit 810 may include a communication processor and/or an antenna transmitting and receiving radio signals.

The decryption unit 820 decrypts a received license authentication request. More specifically, the decryption unit 820 decrypts license information included in the license authentication request. The decryption unit 820 decrypts license information by using a scheme corresponding to the scheme by which the license information has been encrypted. At this time, decryption may be performed in a public-key decryption scheme.

The controller 830 may include a license request parsing unit 832, distance calculating unit 834, determining unit 836, and authentication determining unit 838.

The license request parsing unit 832 parses a decrypted license authentication request and identifies location information, time information, and code information for license authentication.

The license location information may be provided to the distance calculating unit 834. The distance calculating unit 834 determines spatial validity based on the license location information. The distance calculating unit 834, instead of identifying an accurate location based on the coordinates of the client terminal, determines spatial validity based on a relative distance with respect to a wireless access point apparatus. A first distance calculating unit of the distance calculating unit 834 calculates a distance to a valid location of the license based on the coordinates of the wireless access point (which may be acquired through GPS equipment). A second distance calculating unit of the distance calculating unit 834 calculates a distance between the wireless access point apparatus and the client terminal based on a radio signal of the client terminal. Then the distance information calculated by the first and the second distance calculating units is provided to the determining unit 836.

The determining unit 836 checks whether a difference between the distance calculated by the first distance calculating unit and the distance calculated by the second distance calculating unit falls within a predetermined tolerance range and determines spatial validity based on the determination result.

Besides the spatial validity determined based on location information, the determining unit 836 determines temporal validity and/or code-based validity based on license time information and/or license code information received from the license request parsing unit 832. The determining unit 836 may determine temporal validity by comparing the license time information with the current time and/or referring to the remaining license valid time and/or may determine validity of a unique code by comparing the license unique code with pre-stored allowed code information.

And if all of the information included in the license information are determined as being valid, the determining unit 836 provides information related to the determination result to the authentication determining unit 838. If all of the determination results in the determining unit 836 are valid, the authentication determining unit 838 finally determines that authentication of the license is valid. If any one of the determination results is found to be irrelevant, the authentication determining unit 838 does not authenticate the license. If authentication is valid, the authentication determining unit 838 generates license authentication information which proves valid authentication. At this time, the authentication information may include information which activates the license. This information may include license key information.

The transmitting unit 840 transmits the generated license authentication information to the client terminal.

Figure 9:
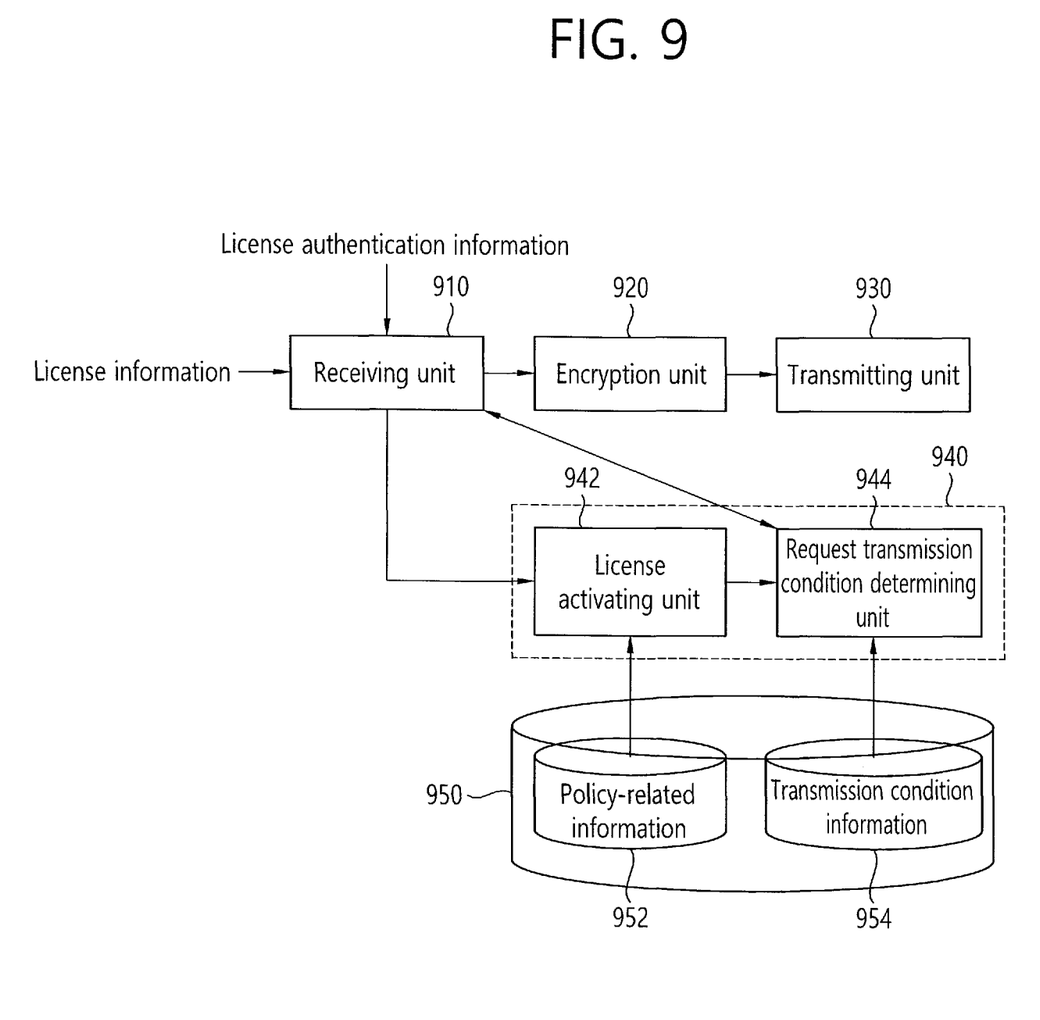
FIG. 9 is a block diagram illustrating a structure of a client apparatus for activating a license according to one embodiment of the present invention.

FIG. 9 is a block diagram illustrating a structure of a client apparatus for activating a license according to one embodiment of the present invention. As shown in FIG. 9, the client apparatus according to one embodiment of the present invention may comprise a receiving unit 910, encryption unit 920, transmitting unit 930, controller 940, and storage unit 950.

Referring to FIG. 9, the receiving unit 910 may receive license information from other device through the network and receive license authentication information from a wireless access point.

First, if a triggering condition for generating a license authentication request with respect to license information is satisfied while the license information has already been obtained, the receiving unit 910 provides the obtained license information to the encryption unit 920.

The determination above may be performed by the request transmission condition determining unit 944 of the controller 940. The request transmission condition may be stored in the storage unit 950 (for example, a local storage) as transmission condition information 954.

According to an embodiment of the present invention, a transmission condition for triggering an authentication request may include a location-based case in which approach to a specific location is recognized, a time-based case in which a specific time is recognized, and/or a network-based case in which an authentication request is associated with a specific network (or a specific client terminal). The association may include a case of being connected to a network or a case of receiving a signal related to the request from a specific client terminal. Similarly, the transmission condition may include a contents/application-based condition for controlling the client terminal to perform an authentication request in conjunction with execution of specific contents and/or an application. Or the transmission condition may also include a period with which an authentication request is transmitted.

The encryption unit 920 encrypts license information, generates a license authentication request, and provides the generated license authentication request to the transmitting unit 930.

The transmitting unit 930 transmits the license authentication request to at least one wireless access point.

When license authentication is completed by the wireless access point, and the receiving unit 910 acquires the license authentication information, the receiving unit 910 provides the acquired license authentication information to the controller 940.

The license activating unit 942 of the controller 940 may activate the license by parsing the acquired license authentication information. The license activating unit 942 loads policy-related information 952 stored in the storage unit 950 and activates the license according to the loaded policy.

The policy may be configured or applied separately for each license, terminal, user, or contents/application related to execution. For example, the license may be made to be activated only when a license provider who has generated the license directly generates a policy related to license activation, and a particular condition is satisfied.

A policy related to license activation may include identification information of an adjacent access point which has to receive authentication or information about the number (ratio) of access points which have to receive authentication with respect to the total number of access points included in an area of a particular size.

The license activating unit 942 may check which access point has authenticated the license by parsing acquired license authentication information. And the license activating unit 942 determines whether to activate the license based on the policy, and if it is determined that the license may be activated, the license activating unit 942 may decrypt the license to execute contents and/or applications.

The client device may further comprise a display unit (not shown); and generate and display a screen related to contents and/or applications through the display unit.

In this document, the present invention has been described with reference to appended drawings and embodiments, but the technical scope of the present invention is not limited to the drawings or embodiments. Rather, it should be understood by those skilled in the art to which the present invention belongs that the present invention may be modified or changed in various ways without departing from the technical principles and scope of the present invention disclosed by the appended claims below.

According to license authentication method and a license activation method of the present invention, only the distance between a wireless access point (AP) and a client needs to be determined whereas a precise location of the client terminal is not necessarily determined. Therefore, a separate location determination module is not required, which reduces system complexity. Also, since location-dependent processing rather than device-dependent processing is conducted, exiting wireless infrastructure may be readily utilized, leading to easy adoption of the proposed methods.

Also, since various types of license authentication processing may be performed, and a processing environment may be built independently without involving a connection to an external network, the proposed methods may be useful for various sites requiring security of a security system itself.

What is claimed is:

1. A license authentication method in a wireless access point (AP), comprising:
    receiving a license authentication request including license information from a client;
    calculating a distance of the client from the wireless access point in response to the received license authentication request;
    based on the calculated distance, determining whether the client exists within a range of allowed positions for license authentication related to license location information for allowing authentication of a license included in the license information;
    wherein whether the client exists within the range of allowed positions for license authentication is determined by comparing:
        a first distance value which is a distance from the wireless access point to a position corresponding to the license location information with a second distance value which is a distance from the wireless access point to the client;
        comparing a distance difference between the first distance value and the second distance value with a threshold value; and if the distance difference is smaller than the threshold value, determining that the client exists within the range of allowed positions for license authentication; and
    determining whether to authenticate in response to the license authentication request based on the determining that the client exists within the range of allowed positions for license authentication.

2. The method of claim 1, wherein the second distance value is calculated based on a radio signal transmitted and received between the wireless access point and the client.

3. The method of claim 1, wherein, the determining whether to authenticate in
    response to the license authentication request comprises determining whether to authenticate in response to the license authentication request based on allowed time information included in the license information.

4. The method of claim 1, wherein the determining whether to authenticate in
    response to the license authentication request comprises determining whether to authenticate in response to the license authentication request based on at least one of allowed product identification information and user identification information included in the license information.

5. The method of claim 4, wherein whether to authenticate is determined by comparing at least one of allowed product identification information and user identification information included in the license information with pre-stored allowed product identification information and pre-stored user identification information.

6. The method of claim 5, wherein the pre-stored allowed product identification information and the pre-stored user identification information are obtained from at least one of an internal local storage and an external database.

7. The method of claim 1, wherein the license information includes the license location information, allowed time information and allowed code information related to allowing authentication of a license, wherein the allowed code information includes at least one of allowed product identification information and user identification information.

8. The method of claim 1, wherein the license information is encrypted, and decrypting the license information is further included.

9. The method of claim 8, wherein the license information is public-key encrypted, and the license information is decrypted by a public-key scheme.

10. The method of claim 1, further comprising providing license authentication information to the client according to determination with respect to whether to authenticate in response to the license authentication request.

11. A wireless access point apparatus performing license authentication, comprising:
a non-transitory storage memory;
a processor;
the non-transitory storage memory storing executable instructions that when executed by the processor cause the process to perform functions of:
receiving a license authentication request including license information from a client;
calculating a distance of the client from the wireless access point in response to the received license authentication request;
based on the calculated distance, determining whether the client exists within a range of allowed positions for license authentication related to license location information for allowing authentication of a license included in the license information;
wherein whether the client exists within the range of allowed positions for license authentication is determined by comparing:
a first distance value which is a distance from the wireless access point to a position corresponding to the license location information with a second distance value which is a distance from the wireless access point to the client;
comparing a distance difference between the first distance value and the second distance value with a threshold value; and if the distance difference is smaller than the threshold value, determining that the client exists within the range of allowed positions for license authentication; and
determining whether to authenticate in response to the license authentication request based on the determining that the client exists within the range of allowed positions for license authentication.

* * * * *